3,365,361
PLANT ROOT-KNOT GALL NEMATODE CONTROL
WITH 5-CARBAMOYLOXYIMINO-1,3-DITHIANES
Roger Williams Addor, Pennington, N.J., assignor to American Cyanamid Company, Stamford, Conn., a corporation of Maine
No Drawing. Filed Feb. 23, 1965, Ser. No. 434,611
4 Claims. (Cl. 167—33)

ABSTRACT OF THE DISCLOSURE

There is provided nematocidal compositions adapted for the control of nematodes which comprise a major amount of an inert nematocidal carrier and a 5-carbamoylimino-1,3-dithiane having the formula:

$$H_2C \begin{matrix} S-CH_2 \\ \\ S-CH_2 \end{matrix} C=NOC\overset{O}{\underset{\|}{\phantom{C}}}N\begin{matrix} R_1 \\ \\ R_2 \end{matrix}$$

wherein $R_1$ and $R_2$ are each selected from the group consisting of hydrogen and lower alkyl.

---

The present invention relates to novel oxime carbamates of 1,3-dithianes and has for its principal object the utilization of such carbamates as the active components in insecticidal and nematocidal compositions.

The novel dithiane compounds prepared in accordance with the present invention can be represented by the general formula:

$$H_2C \begin{matrix} S-CH_2 \\ \\ S-CH_2 \end{matrix} C=NOC\overset{O}{\underset{\|}{\phantom{C}}}N\begin{matrix} R_1 \\ \\ R_2 \end{matrix}$$

wherein $R_1$ and $R_2$ are each hydrogen or lower alkyl preferably from 1 to 4 carbon atoms, which may be the same or different.

In general, the compounds of the present invention may be prepared in a straightforward manner. One such process involves bringing into reactive combination at temperatures ranging from about 20° C. to about 80° C. 5-oximino-1,3-dithiane and a lower alkyl isocyanate in equimolar amounts and in the presence of an inert organic solvent. Another procedure involves the reaction between 5-oximino-1,3-dithiane and an alkyl carbamoyl halide in the presence of an alkali metal t-butoxide and an inert organic solvent, such as t-butanol.

The reactant, 5-oximino-1,3-dioxane, can be prepared by methods known in the art as disclosed, for example, by E. G. Howard et al., in the Journal of the American Chemical Society, vol. 82, page 158 and following (1960).

Illustrative but non-limitative reactants include, for instance, lower alkyl isocyanates, such as methyl isocyanate, ethyl isocyanate, propyl isocyanate, t-butyl isocyanate, n-pentyl isocyanate, n-hexyl isocyanate and heptyl isocyanate as well as a carbamoyl halide, such as N,N-dimethyl carbamoyl chloride, N,N-diethyl carbamoyl bromide, N,N-dipropyl carbamoyl chloride and N,N-dibutyl carbamoyl iodide.

In order to facilitate a further understanding of the present invention, the following illustrative examples are presented. These are not to be taken as limitative of the invention. Unless otherwise stated, the parts are by weight.

EXAMPLE 1

*Preparation of 5-methylcarbamoyloxyimino-1,3-dithiane*

To 10.0 parts of 5-oximino-1,3-dithiane, partially dissolved in a mixture of 100 parts of dry acetone and 0.1 part of triethylamine, are added 4.5 parts of methyl isocyanate. After three hours, the mixture is heated to 60° C. to give a clear solution. Partial evaporation of the solvent followed by cooling of the mixture to 0° C. gave 13.0 parts (94% of theory) of 5-methylcarbamoyloxyimino-1,3-dithiane, melting point 129° C. to 130° C. (dec.). A sample recrystallized from ethyl acetate and then from hexane discolored at 132° C. and decomposed at 136° C. On analysis the following is found in percent:

Calc'd for $C_6H_{10}N_2O_2S_2$: C, 34.93; H, 4.89; S, 31.09. Found: C, 34.64; H, 4.84; S, 30.69.

EXAMPLE 2

*Preparation of 5-ethylcarbamoyloxyimino-1,3-dithiane*

The procedure of Example 1 is repeated in every respect except that ethyl isocyanate is substituted for methyl isocyanate. A good yield of 5-ethylcarbamoyloxyimino-1,3-dithiane is obtained as a crystalline solid.

EXAMPLE 3

*5-dimethylcarbamoyloxyimino-1,3-dithiane*

To 8.0 parts of 5-oximino-1,3-dithiane and 5.8 parts of dimethylcarbamoyl chloride in 75 parts of t-butanol are slowly added 6.0 parts of potassium t-butoxide in 25 parts of t-butanol. After stirring for about sixteen hours, the mixture is filtered, diluted with ether and benzene and, finally washed with water. After drying over magnesium sulfate, resultant organic mixture is concentrated in vacuo to yield 82% of theoretical or 8.5 parts of 5-dimethylcarbamoyloxyimino-1,3-dithiane as a viscous oil.

EXAMPLE 4

A 0.1% solution of 5-methylcarbamoyloxyimino-1,3-dithiane in 50/50 acetone/water mixture is prepared. Sieva lima bean leaves are dipped in the test solution and set in a hood to dry. When dried, they are placed in four-inch petri dishes provided with a moist filter paper in the bottom and ten third-instar armyworm larvae are then placed in each dish. Cover plates are placed on the dishes and the dishes are held at 80° F. and 60% relative humidity for two days. At the end of this period the dishes are examined and mortality counts and estimated amount of feeding made. One hundred percent kill of armyworms is obtained in the tests with leaves treated with 5-methylcarbamoyloxyimino-1,3-dithiane.

EXAMPLE 5

The activity of 5-methylcarbamoyloxyimino-1,3-dithiane in controlling nematodes is shown by the following tests. Sandy soil is thoroughly mixed with graded levels of the above-identified compound dissolved in acetone. Approximately one-half pint of each of the soil-compound mixtures is placed in pint containers and an aqueous suspension containing eggs, larvae and adults of the root-knot nematode (*Meloidogyne*) prepared from heavily infested tomato roots is added thereto. An additional half pint of treated soil is added to each container, then watered with 25 milliliters of tap water and placed on greenhouse benches. Seven days after treatment, seedling tomato plants, 2 to 4 inches tall, are planted in the treated soils. These were returned to the greenhouse where they are cared for in the usual manner for three weeks. On termination of this period, all plants are removed from their containers and examined for root galls. It is observed that all plants growing in soils treated with 5-methylcarbamoyloxyimino-1,3-dithiane applied at a rate equivalent to 5 pounds of active ingredient per acre are free of galls.

In lieu of 5-methylcarbamoyloxyimino-1,3-dithiane, 2-methylcarbamoyloxyimino-1,3-dithiane is employed. It is found that 25 pounds per acre of the latter isomeric compound are required to achieve nematocidal control.

The compounds of the present invention find utility as insecticides as well. However, it is an advantage to utilize the insecticidal or nematocidal compositions of the present invention in dilute concentrations by incorporating the latter compounds in a variety of inert carriers or diluents. For instance, the compounds may be dissolved in an inert organic solvent such as acetone, ethyl acetate, ethyl alcohol, benzene, kerosene and equivalents thereof, or they may be admixed with an inert solid carrier as, for example, fuller's earth, bentonite, and the like. If desired, a suspension of the active compounds may be prepared by employing a non-solvent. In that event, it is advantageous to add thereto any commercially available dispersing or surface-active agent of, for example, the anionic or nonionic types.

The quantity of inert solid or liquid carrier or diluent is not critical. It has, however, been found that from about 0.0001% to about 10% by weight of the compound, based on the weight of the inert carrier is generally sufficient and effective.

I claim:
1. A process for the control of plant root-knot gall nematodes which consists essentially in: applying to soil which contains said nematodes a nematocidally effective amount of a 1,3-dithiane of the formula:

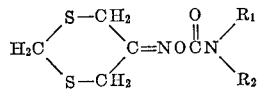

wherein $R_1$ and $R_2$ are each selected from the group consisting of hydrogen and lower alkyl at a rate effective for the control of plant root-knot galls, said rate being equivalent to about 5 pounds per acre and substantially less than 25 pounds per acre.

2. The process according to claim 1 wherein the 1,3-dithiane is 5-methylcarbamoyloxyimino-1,3-dithiane.

3. The process according to claim 1 wherein the 1,3-dithiane is 5-ethylcarbamoyloxyimino-1,3-dithiane.

4. The process according to claim 1 wherein the 1,3-dithiane is 5-dimethylcarbamoyloxyimino-1,3-dithiane.

References Cited
UNITED STATES PATENTS

| | | | |
|---|---|---|---|
| 3,183,148 | 5/1965 | Cannon et al. | 167—33 |
| 3,193,561 | 7/1965 | Addor | 260—327 |
| 3,223,585 | 12/1965 | Addor | 167—33 |

S. K. ROSE, *Primary Examiner.*